United States Patent [19]

Kerrebrock

[11] Patent Number: 5,443,798
[45] Date of Patent: Aug. 22, 1995

[54] SEPARATOR PLATE FOR A CHEMICAL OXYGEN GENERATOR CANDLE AND ASSEMBLY AND GENERATOR MADE THEREFROM

[75] Inventor: Peter Kerrebrock, Attleboro, Mass.

[73] Assignee: The Charles Stark Draper Laboratories, Cambridge, Mass.

[21] Appl. No.: 143,859

[22] Filed: Oct. 27, 1993

[51] Int. Cl.⁶ .......................... B01J 10/00; A62B 7/08; C06D 5/00; C01B 7/00
[52] U.S. Cl. .................................. 422/129; 422/120; 422/123; 422/124; 422/164; 422/165; 422/305; 102/530; 102/531; 423/241
[58] Field of Search ............... 422/120, 122, 123, 124, 422/129, 164, 165, 305; 102/530, 531; 423/241, 247

[56] References Cited

U.S. PATENT DOCUMENTS

| | | | |
|---|---|---|---|
| 2,976,678 | 3/1961 | Kennedy | 102/531 |
| 3,089,419 | 5/1963 | Pollard | 102/531 |
| 3,148,034 | 9/1964 | Bovard et al. | 422/120 |
| 3,230,045 | 1/1966 | Miller | 422/120 |
| 3,536,456 | 10/1970 | Bovard | 422/120 |
| 3,719,456 | 3/1973 | Bode | 422/120 |
| 3,828,676 | 8/1974 | Junker | 102/530 |
| 4,822,572 | 4/1989 | van der Smissen et al. | 422/126 |

OTHER PUBLICATIONS

Puritan-Bennett Aero Systems Co. Product Description of 117003 Series Chemical Oxygen Generators.
Schechter et al, "Chlorate Candles as a Source of Oxygen", *Industrial and Engineering Chemistry*, vol. 42, No. 11, pp. 2348-2352, Nov. 1950.
"Chemical Oxygen General Information", Aerospace Information Report, Society of Automotive Engineers, Inc. 1969.
"Chlorate Candle Oxygen Data", MSA Research Corp. Division, Nov. 1986.
Thompson, Jr., Edward, "System Evaluation of Solid Chemical Oxygen Generators", National Technical Information Service, Mar. 1975.
Martin, F. E., "Development of Rescue and Escape Breathing Apparatus Based on a Chlorate Candle Oxygen Source", ASME, Apr. 1, 1979.
Lee et al, "Power Sources for Unmanned Underwater Vehicles," *Sea Technology*, Oct. 1989.

*Primary Examiner*—Robert J. Warden
*Assistant Examiner*—Christopher Y. Kim
*Attorney, Agent, or Firm*—Iandiorio & Teska

[57] ABSTRACT

A separator plate for a chemical oxygen generator candle includes an elongate rigid thermal insulating section; and at least a first conduit section on one side of the rigid section having a multiplicity of gas flow paths for conducting released oxygen from a burning candle longitudinally along the plate for increasing the burning action of the burning portion of the candle and pre-heating the unburned portion of the candle, and for retaining gas to act as a thermal insulator when the candle is not burning. A plurality of such plates are combined to form a separator assembly for surrounding a candle and a number of such separator assemblies are combined to form a multi-candle oxygen generator.

30 Claims, 4 Drawing Sheets

SEPARATOR PLATE FOR A CHEMICAL OXYGEN GENERATOR CANDLE AND ASSEMBLY AND GENERATOR MADE THEREFROM

FIELD OF INVENTION

This invention relates to a separator plate for a chemical oxygen generator candle and to such a plate which can be joined with others to make one or more assemblies that can be combined to form a multi-candle oxygen generator system.

BACKGROUND OF INVENTION

A chlorate (or perchlorate) candle is a chemical device used to store and produce gaseous oxygen. It is both weight and volume efficient, when compared to conventional pressurized oxygen storage. A candle usually consists of a mixture of granular sodium chlorate (or may alternatively contain lithium chlorate, sodium perchlorate,or lithium perchlorate), iron particles, fiberglass binder and other trace chemicals (used for controlling oxygen gas impurities) that is pressed or cast into a cylinder (or other cross sectional form), resembling a wax candle. When the end of a candle is ignited (either by a resistance wire, chemical ignition "cap" or other means) the sodium chlorate decomposes exothermally producing oxygen. The temperature required to sustain decomposition of the candle is supplied by oxidation of the iron. Candles were developed during the Second World War and are in widespread use today for purposes ranging from emergency oxygen generation on commercial airliners to producing welding gas. Candles release about thirty-five to forty-five percent of their weight as oxygen, depending on the chemical used. Sodium chlorate provides the lowest performance, but is easiest to implement. Candles based on other chemicals are currently only developmental.

In most applications such as aircraft emergency breathing and welding gas supply, candles are packaged and discharged individually. An oxygen generator for an unmanned undersea vehicle (UUV) energy system, however, will require a number of candles that are discharged sequentially or in combination to meet anticipated UUV power consumption profiles. Development of a practical oxygen generator requires optimizing the arrangement of candles in a single pressure vessel, to minimize weight and volume of the system. Dense packaging of the candles is desirable but adequate thermal insulation of each candle is required to prevent a burning candle from igniting an adjacent candle. Additionally, the candles must be supported to prevent movement and breakage. Although there are few examples of multi-candle oxygen generators (MCOG's), those that have been made rely on a free-standing structure resembling a wine rack into which candles can be inserted. The pressure vessel surrounds the wine rack and candle assembly.

A primary disadvantage of this method is that it requires a separate structure to support the candles, which increases the weight and volume of the oxygen generator. This structure also must support the thermal insulation surrounding each candle.

This invention features a separator plate for a chemical oxygen generator candle including an elongate rigid thermal insulating section and at least a first conduit section on one side of the rigid section having a multiplicity of gas flow paths for conducting released oxygen from a burning candle longitudinally along the plate for increasing the burning action of the burning portion of the candle and preheating the unburned portion of the candle and for retaining gas to act as a thermal insulator when the candle is not burning.

In a preferred embodiment there is a second conduit section on the other side of the rigid section opposite the first conduit section. The plate may be generally planar and the surface of the first conduit section facing the candle may be curved or conformed to whatever shape the candle may have. The second conduit section may also be curved or conform to whatever shape the candle may have.

SUMMARY OF INVENTION

It is therefore an object of this invention to provide an improved separator plate for a chemical oxygen generator candle.

It is a further object of this invention to provide such an improved separate plate which can be easily joined with others to form one or more separate assemblies for containing individual candles and which can be further combined to form a multiple candle oxygen generator system.

It is a further object of this invention to provide such a separator plate which provides physical support and thermal insulation for a candle in a more volumetrically and weight efficient structure.

It is a further object of this invention to provide such a separator plate which provides a path for the controlled release of the generated oxygen.

It is a further object of this invention to provide such a separator plate which flows the released oxygen over the candle to preheat the candle and increase burning rate.

It is a further object of this invention to provide such a separator plate which retains gas to act as an additional thermal insulator to protect the candle when it is not burning.

The invention results from the realization that an improved, more compact, lighter weight, chemical oxygen generator candle system can be constructed from a number of separator assemblies formed from a plurality of separator plates which include a structurally rigid, thermally insulating section and a conduit section on at least one side of the insulating section for conducting released oxygen from a burning candle longitudinally along said plate for increasing the burning action of the burning portion of the candle and for retaining gas to act as thermal insulation when the candle is not burning.

The invention also features a separator assembly for a chemical oxygen generator candle including a plurality of elongate separator plates disposed with their longitudinal edges in abutting relationship to form a shell for surrounding and supporting a candle. Each plate includes an elongate rigid thermal insulating section and at least a first conduit section on one side of the rigid section having a multiplicity of gas flow paths for conducting released oxygen from a burning candle longitudinally along the plate for increasing the burning action of the burning portion of the candle and preheating the unburned portion of the candle, and for retaining gas to act as an additional thermal insulator when the candle is not burning. The plates may be integrally joined and there may be a closure at one end to form a container with an opening at the other end.

The invention also features a chemical oxygen generator candle system having a number of separator assemblies each formed from a plurality of elongate separator plates. Each of the plates is disposed with their longitudinal edges in abutting relationship to form a shell for surrounding and supporting a candle. Each plate includes an elongate rigid thermal insulating section and at least a first conduit section on one side of the rigid section having a multiplicity of gas flow ports for conducting released oxygen from a burning candle longitudinally along the plate for increasing the burning action of the burning portion of the candle and preheating the unburned portion of the candle, and for retaining gas to act as an additional thermal insulator when the candle is not burning. The plates shared by two adjacent separator assemblies include a second conduit section on the other side of the rigid section opposite the first conduit section.

DISCLOSURE OF PREFERRED EMBODIMENT

Other objects, features and advantages will occur to those skilled in the art from the following description of a preferred embodiment and the accompanying drawings, in which.

Figure 1:
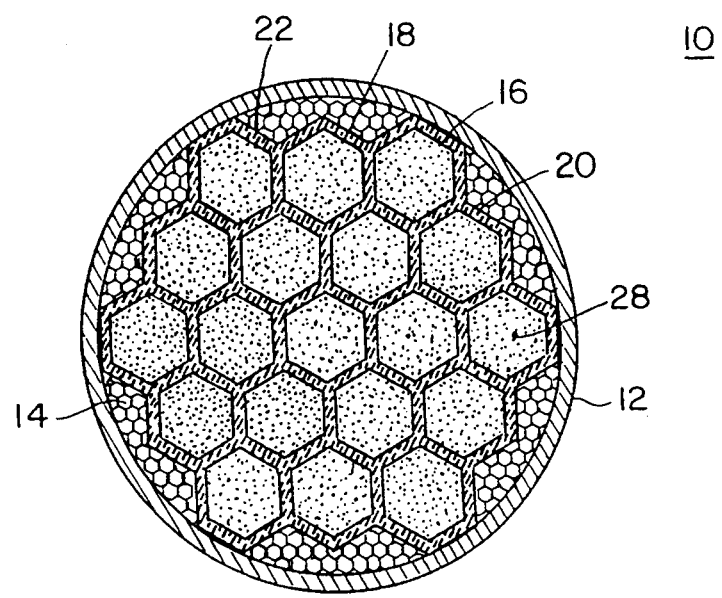
FIG. 1 is a top plan view of a chemical oxygen generator candle system constructed from a number of separator assemblies formed frown separator plates according to this invention.

There is shown in FIG. 1 a chemical oxygen generator candle system 10 including an oxygen generator pressure vessel 12 typically made of stainless steel or similar material and lined with a peripheral porous support structure 14 which may be for example a stainless steel honeycomb. Within the support structure 14 is a plurality of separator assemblies 16, 18, 20, 22, each of which supports and surrounds a candle 28. Within each assembly 16, 18, 20, 22 is contained an oxygen candle typically formed of sodium chlorate or sodium perchlorate, lithium chlorate, or lithium perchlorate.

Figure 2:
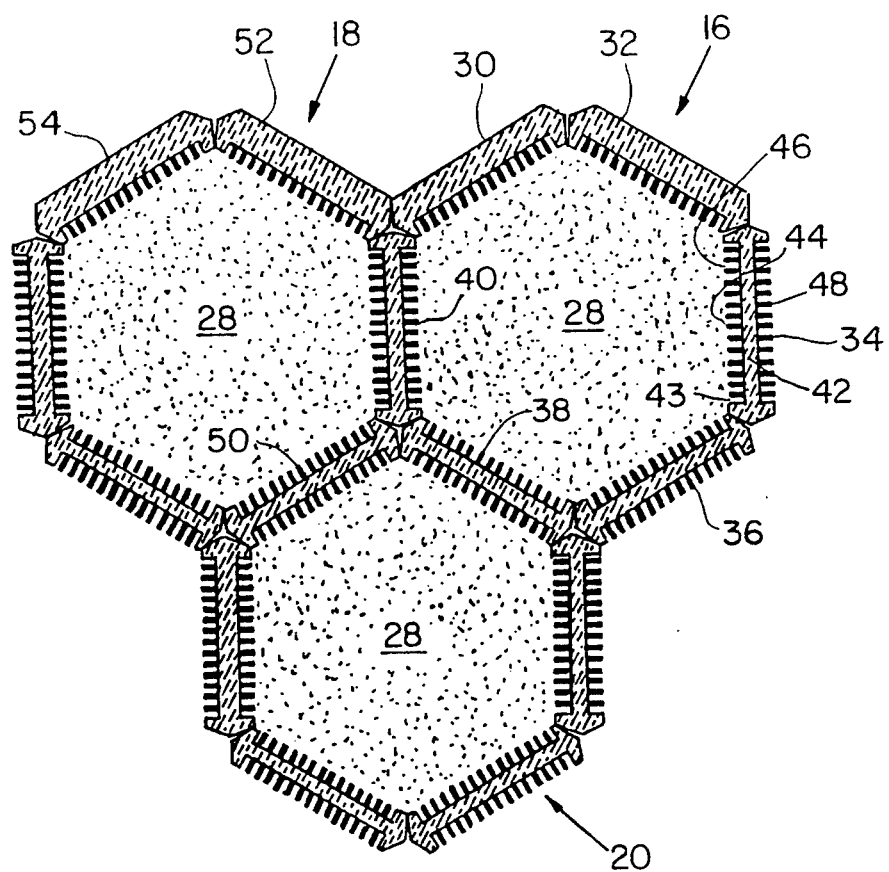
FIG. 2 is an enlarged detailed view of three of the separator assemblies shown in FIG. 1.

Each separator assembly 16, 18, 20, FIG. 2, includes a number of separator plates, for example plates 30, 32, 34, 36, 38 and 40, as shown with respect to separator assembly 16. These plates may be made of a ceramic or refractory material such as but not limited to aluminum silicate which may be formed by extrusion, pressing or machining. Although in this case assembly 16 is shown as formed of six independent separator plates 30-40, this is not a necessary limitation of the invention as the assembly may be made of more or fewer such separator plates and in fact may be made as a single unit so that the entire wall is a single integral element. Each separator plate 30-40, as exemplified includes an elongate, rigid, thermal insulating section 42, and at least a first conduit section 43 facing candle 28.

The conduit section includes a multiplicity of gas flow paths 46 for conducting released oxygen from a burning candle longitudinally along the plate to increase the burning action of the burning portion of the candle and to preheat the unburned portion of the candle. A second conduit section 48 may be provided on the other side of rigid section 42. When these outer conduit sections 48 are provided on the peripheral separator assemblies, they function as thermal insulators which prevent unburned candles adjacent to the burning candle from heating to the ignition temperature and burning prematurely. When separator plates having double-sided conduit sections are used between assemblies they increase the efficiency of the design by acting as a portion of the structure of each of the two adjacent separator assemblies so that a single separator plate is shared as a wall for two adjacent assemblies, which can be seen with respect to the separator plates 38, 40, and 50. When separator plates are used on an outside assembly, then their outer surface need not contain a second conduit section as is exemplified by separator plates 30, 32, 52 and 54, for example.

Figure 4:
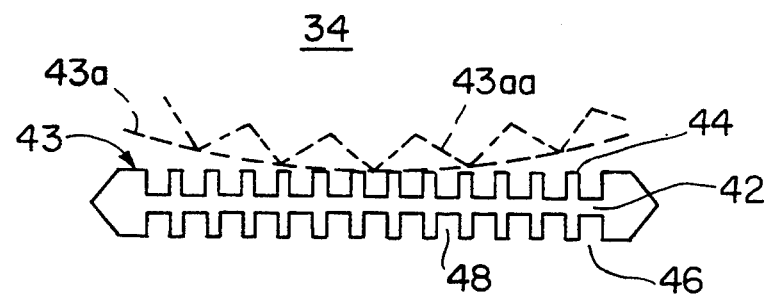
FIG. 4 is a top plan view of the separator plate of FIG. 3.
Figure 3:
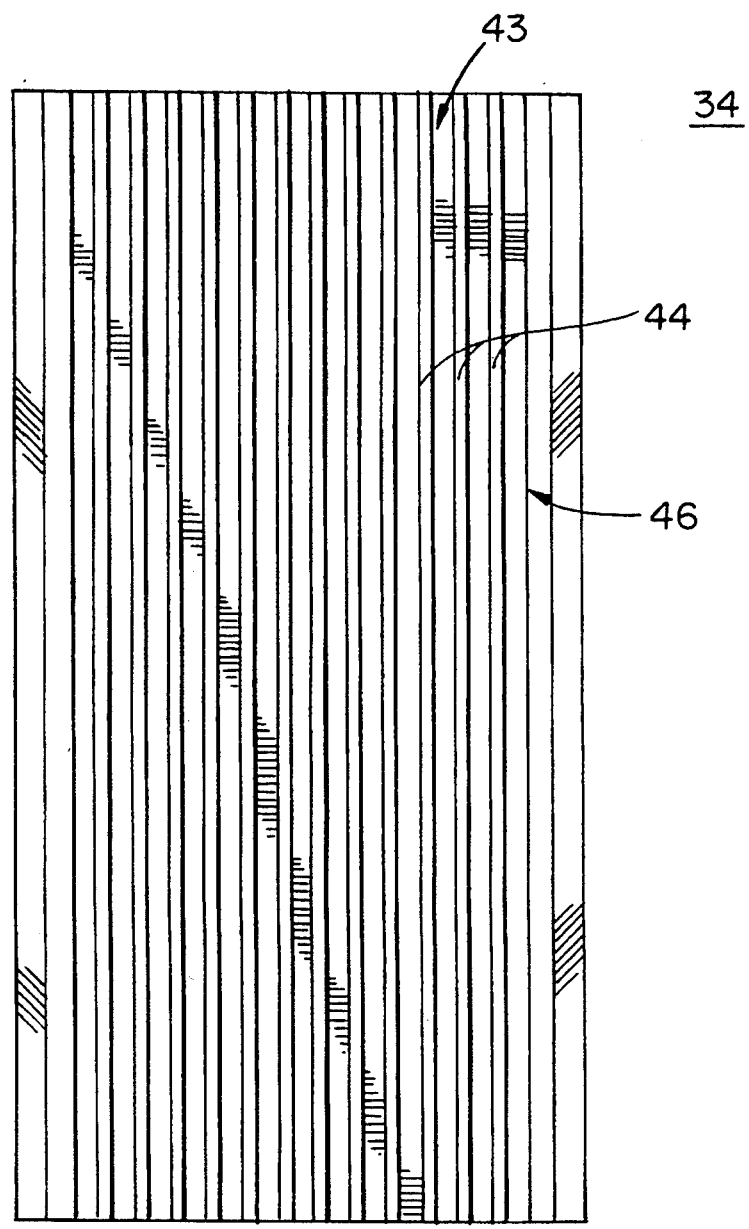
FIG. 3 is a side elevational view of a separator plate of FIG. 2 according to this invention.

Each separator plate, such as plate 34, FIGS. 3 and 4, may be approximately 6-12 inches high, 1/10 to ⅛ inch thick, and ¾ inch wide or wider. The grooved gas flow paths longitudinally the full length of the separator plate and are roughly square in cross section with a depth that is as close as possible to one-half the width of the separator plate, typically, 0.040×0.040 inch. Although the grooved gas flow paths are shown square in FIGS. 2, 3 and 4, they may have any shape including semicircular, triangular, or an irregular shape such as shown for example in FIG. 6, explained hereafter. The surface of conduit sections 43 may be flat as shown in FIG. 2, or curved 43a, or any other shape 43aa as shown in FIG. 4.

Figure 5:
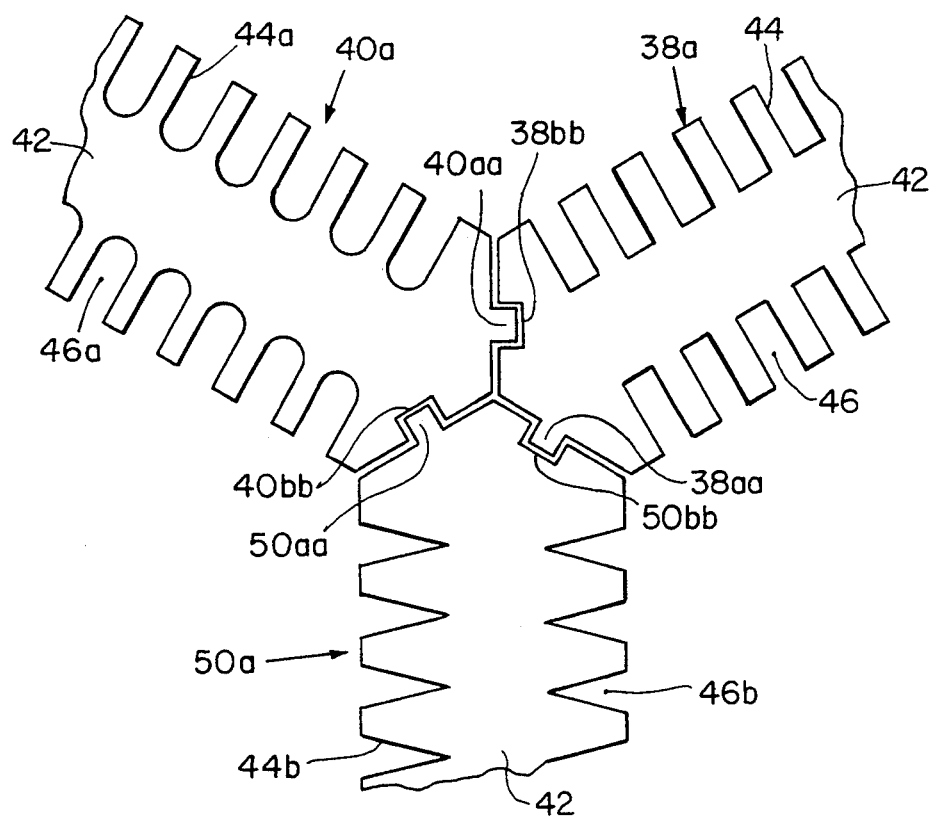
FIG. 5 is an enlarged detail view of a junction of three separator plates with interlocking means for coupling the separator plates together.

Although in FIGS. 1 and 2 separator plates forming the assemblies are simply held together by the containment of vessel 12 and the porous support structure 14, this is not a necessary limitation of the invention. For example, each of the separator plates may have interlocking means on its longitudinal edge to couple with neighboring separator plates. Separator plates 38a, 40a and 50a, FIG. 5, each contain a male tongue 38aa and female groove 38bb, male tongue 40aa, female groove 40bb, male tongue 50aa and female groove 50bb.

Figure 6:
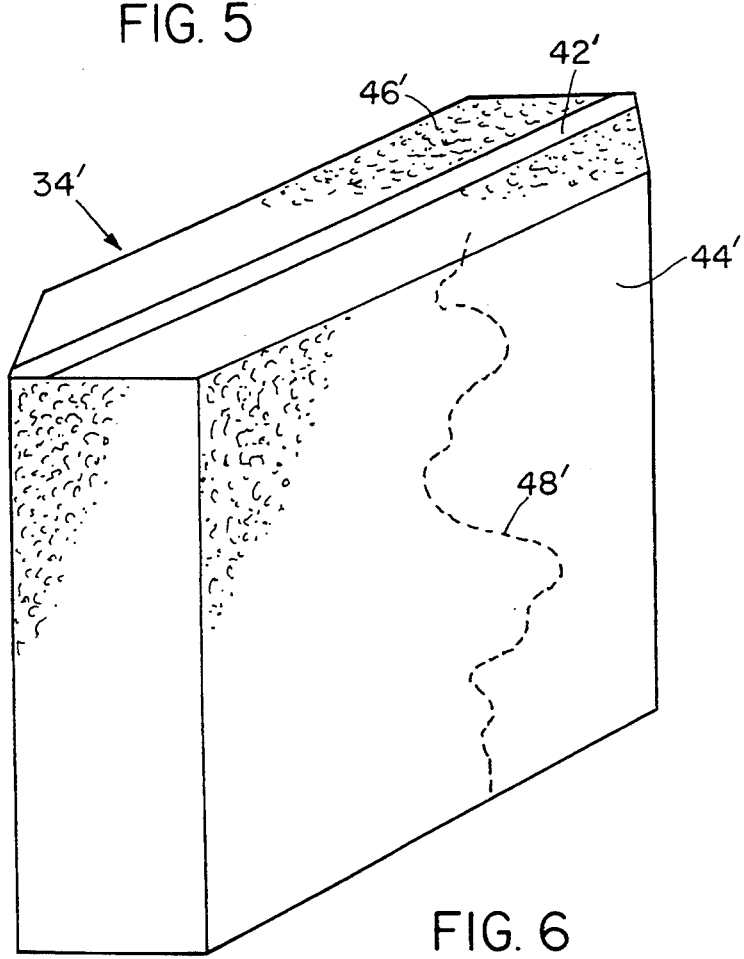
FIG. 6 is a perspective view of an alternatively constructed separator plate using open cell pores instead of longitudinal grooves.

Conduit sections 43 and 48 have been shown formed with grooved gas flow paths 46 to provide the longitudinal conduction path, but this is not a necessary limitation of the invention. For example, as shown in FIG. 6, separator plate 34' having a rigid thermal insulating section 42', includes two conduit sections 43' and 48', each of which is made up of an open cell porous material such as but not limited to aluminum silicate, whose cells have a diameter of 0.020-0.030 for example. These open cells create an irregular, often tortuous, but nevertheless complete path from one end to the other of separator plate 34' to conduct the released oxygen. This path is indicated by dashed line 48'.

Figure 7:
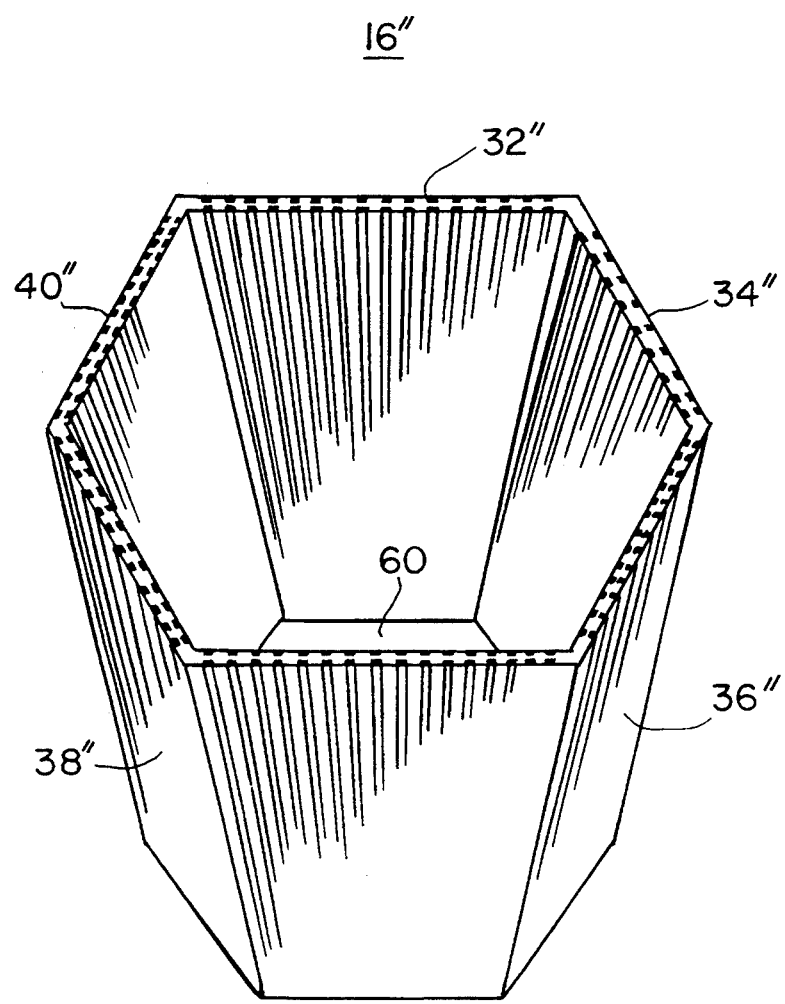
FIG. 7 is a perspective view of a single assembly made from a plurality of separator plates according to this invention with one end closed and one end open.

Although thus far the separator assemblies have been depicted only as constructed of a number of separator plates, this is not a necessary limitation of the invention. For example, as shown in FIG. 7, the separator plates 30", 32", 34", 36", 38", and 40" are formed as an integral unit complete with a bottom or closure portion 60 to form a container or cup that is single-ended. A candle installed in separator assembly 16" can be ignited at the lower closed end of separator assembly 16' so that as it burns the released oxygen is forced to travel up the grooves between the candle and the separator assembly, thereby preheating and increasing the burn rate of the candle.

Although specific features of this invention are shown in some drawings and not others, this is for convenience only as each feature may be combined with any or all of the other features in accordance with the invention.

Other embodiments will occur to those skilled in the art and are within the following claims:

What is claimed is:

1. A separator plate for a chemical oxygen generator candle comprising:
   an elongate rigid thermal insulating section; and
   at least a first conduit section on one side of said rigid section including means for providing a multiplicity of gas flow paths for conducting released oxygen from a burning candle longitudinally along said plate for increasing the burning action of the burning portion of the candle and pre-heating the unburned portion of the candle and for retaining gas to act as an additional thermal insulator when the candle is not burning.

2. The separator plate of claim 1 in which there is a second conduit section including means for providing a multiplicity of gas flow paths on the side of said rigid section opposite said first conduit section.

3. The separator plate of claim 1 in which said plate is planar.

4. The separator plate of claim 3 in which the surface of said first conduit section facing the candle is curved.

5. The separator plate of claim 3 in which the surface of said first conduit section facing the candle is conformed to the shape of the candle.

6. The separator plate of claim 2 in which the surface of said second conduit section facing the candle is curved.

7. The separator plate of claim 2 in which the surface of said second conduit section facing the candle is conformed to the shape of the candle.

8. The separator plate of claim 1 further including engagement means at each edge of said separator plate for coupling to adjacent separator plates.

9. A separator assembly for a chemical oxygen generator candle comprising:
   a plurality of elongate separator plates disposed with their longitudinal edges in abutting relationship with each other to form a shell for surrounding and supporting a candle, each said plate including:
   an elongate rigid thermal insulating section; and
   at least a first conduit section on one side of said rigid section including means for providing a multiplicity of gas flow paths for conducting released oxygen from a burning candle longitudinally along said plate for increasing the burning action of the burning portion of the candle and pre-heating the unburned portion of the candle and for retaining gas to act as a thermal insulator when the candle is not burning.

10. The separator assembly of claim 9 in which there is a second conduit section including means for providing a multiplicity of gas flow paths on the side of said rigid section opposite said first conduit section.

11. The separator assembly of claim 9 in which said plate is planar.

12. The separator assembly of claim 11 in which the surface of said first conduit section facing the candle is curved.

13. The separator assembly of claim 11 in which the surface of said first conduit section facing the candle is conformed to the shape of the candle.

14. The separator assembly of claim 10 in which the surface of said second conduit section facing the candle is curved.

15. The separator assembly of claim 10 in which the surface of said second conduit section facing the candle is conformed to the shape of the candle.

16. The separator assembly of claim 9 further including engagement means at each edge of said plate for coupling to adjacent plates.

17. The separator assembly of claim 9 in which said plates are integrally joined and there is a closure at one end to form a container with an opening at the other end.

18. A chemical oxygen generator candle system comprising:
   a number of separator assemblies each formed from a plurality of elongate separator plates disposed with their longitudinal edges in abutting relationship to form a shell for surrounding and supporting a candle, each said plate including:
   an elongate rigid thermal insulating section; and
   at least a first conduit section on one side of said rigid section including means for providing a multiplicity of gas flow paths for conducting released oxygen from a burning candle longitudinally along said plate for increasing the burning action of the burning portion of the candle and pre-heating the unburned portion of the candle and for retaining gas to act as an additional thermal insulator when the candle is not burning.

19. The chemical oxygen generator candle system of claim 18 in which said plate is planar.

20. The chemical oxygen generator candle system of claim 19 in which the surface of said first conduit section facing the candle is curved.

21. The chemical oxygen generator candle system of claim 19 in which the surface of said first conduit section facing the candle is conformed to the shape of the candle.

22. The chemical oxygen generator candle system of claim 18 in which the surface of said conduit section facing the candle is curved.

23. The chemical oxygen generator candle system of claim 18 in which the surface of said second conduit section facing the candle is conformed to the shape of the candle.

24. The chemical oxygen generator candle system of claim 18 further including engagement means at each edge of said plate for coupling to adjacent plates.

25. The separator plate of claim 1 in which said means for providing a multiplicity of gas flow paths includes vertical grooves integral with said conduit section.

26. The separator plate of claim 1 in which said means for providing a multiplicity of gas flow paths includes an open cell porous material integral with said conduit section.

27. The separator assembly of claim 9 in which said means for providing a multiplicity of gas flow paths include vertical grooves integral with said conduit section.

28. The separator assembly of claim 9 in which said means for providing a multiplicity of gas flow paths includes an open cell porous material integral with said conduit section.

29. The chemical oxygen generator candle system of claim 18 in which said means for providing a multiplicity of gas flow paths includes vertical grooves integral with said conduit section.

30. The chemical oxygen generator candle system of claim 18 in which said means for providing a multiplicity of gas flow paths includes an open cell porous material integral with said conduit section.

* * * * *